United States Patent
Sheaffer et al.

(10) Patent No.: US 9,850,365 B1
(45) Date of Patent: Dec. 26, 2017

(54) ELECTRICALLY INSULATING COMPOSITION USED IN CONJUNCTION WITH DYNAMOELECTRIC MACHINES

(71) Applicant: General Electric Company, Schenectady, NY (US)

(72) Inventors: Jeffrey David Sheaffer, Glenville, NY (US); David John Wardell, Ballston Spa, NY (US); Jessica Mary Powers, Colonie, NY (US); Stephen Frank Francese, Malta, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/188,287

(22) Filed: Jun. 21, 2016

(51) Int. Cl.
  *H02K 3/30* (2006.01)
  *C08K 3/38* (2006.01)
  *C08K 3/40* (2006.01)
  *C09K 5/14* (2006.01)

(52) U.S. Cl.
  CPC .................. *C08K 3/40* (2013.01); *C09K 5/14* (2013.01); *H02K 3/30* (2013.01); *C08K 2003/385* (2013.01)

(58) Field of Classification Search
  None
  See application file for complete search history.

(56) References Cited

U.S. PATENT DOCUMENTS

| | | | |
|---|---|---|---|
| 4,621,212 A | 11/1986 | Torossian et al. | |
| 4,631,230 A | 12/1986 | Torossian et al. | |
| 5,464,949 A | 11/1995 | Markovitz et al. | |
| 6,043,582 A | 3/2000 | Markovitz et al. | |
| 6,462,458 B1 | 10/2002 | Tong et al. | |
| 6,548,576 B1 | 4/2003 | Winter | |
| 7,655,868 B2 | 2/2010 | Sheaffer et al. | |
| 2009/0174279 A1 | 7/2009 | Sheaffer et al. | |
| 2010/0063192 A1* | 3/2010 | Okubo | H01B 3/301 524/404 |
| 2014/0246929 A1 | 9/2014 | Francese et al. | |
| 2015/0155070 A1 | 6/2015 | Cao et al. | |
| 2015/0375432 A1 | 12/2015 | Baril et al. | |

FOREIGN PATENT DOCUMENTS

| | | | |
|---|---|---|---|
| JP | 2011-148917 A | * | 8/2011 |
| KR | 2009-0008134 | * | 8/2009 |

OTHER PUBLICATIONS

Translation for JP 2011-148917 (no date).*
Translation for KR 2009-0088134 (no date).*
English translation of "Preparation and Properties of Epoxy resin/Glass Fiber/BN High Thermal Conductive Composites" authored by Hai-yuan et al. and published in Zhanjie (2010) 31(8) 52-55.*

* cited by examiner

*Primary Examiner* — Marc Zimmer
(74) *Attorney, Agent, or Firm* — James W. Pemrick; Ernest G. Cusick; Frank A. Landgraff

(57) ABSTRACT

An electrically insulating composition comprising about 25 to about 55 percent by weight of filler materials, about 45 to about 75 percent by weight of resin. The percentages being selected such that the total percentage of components does not exceed 100 percent. The composition has a thermal conductivity of about 0.2 to about 1.3 W/m-K when measured at 130° C.

17 Claims, 3 Drawing Sheets

ELECTRICALLY INSULATING COMPOSITION USED IN CONJUNCTION WITH DYNAMOELECTRIC MACHINES

BACKGROUND OF THE INVENTION

The composition described herein relates generally to an electrically insulating composition for use with dynamoelectric machines and, more specifically, to an insulating composition having improved thermal conductivity.

Large or utility scale generators produce large amounts of power, and also produce heat due to the large currents passing through the conductors. Generators employ indirect or direct cooling with air, hydrogen or water, depending on the amount of power generated and the amount of cooling required. Specific areas of the generator may benefit from additional electrical insulation due to close proximity of neighboring generator components. Series loops and phase leads connect the multiple stator loops together, are external to the stator core and are in close proximity to each other. One series loop may be at ground potential and an adjacent series loop could be at full voltage potential. Therefore, electrical insulation is placed over each series loop.

BRIEF DESCRIPTION OF THE INVENTION

In an aspect of the present invention, an electrically insulating composition is about 25 to about 55 percent by weight of filler materials, about 45 to about 75 percent by weight of resin. The percentages being selected such that the total percentage of components does not exceed 100 percent. The composition has a thermal conductivity of about 0.2 to about 1.3 W/m-K when measured at 130° C.

In another aspect of the present invention, An electrically insulating composition is to be used with a catalytic hardener and accelerator. The composition has about 25 to about 55 percent by weight of filler materials. The filler materials have about 15 to about 25 percent of glass, 0 to about 30 percent of boron nitride and 0 to about 1.5 percent of fumed silica. The composition also has about 45 to about 75 percent by weight of resin. The resin is Bisphenol A (BpA) resin. The percentages are selected such that the total percentage of composition components does not exceed 100 percent. The composition has a thermal conductivity of about 0.2 to about 1.3 W/m-K when measured at 130° C.

In yet another aspect of the present invention, an electrically insulating composition is to be used with a catalytic hardener and accelerator, and the composition is adapted for insulating generator components. The composition has about 20 to about 25 percent of silane-treated glass, and about 15 to about 22.5 percent of boron nitride. The boron nitride is about 80 percent spherical boron nitride and about 20 percent flake boron nitride. The composition also has about 0.2 percent of silane-treated fumed silica, about 0 to 0.5 percent pigment, with resin comprising the balance. The resin is a Bisphenol A (BpA) resin. The percentages being selected such that the total percentage of composition components does not exceed 100 percent, and the composition has a thermal conductivity of about 0.6 to about 1.0 W/m-K when measured at 130° C.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related and system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
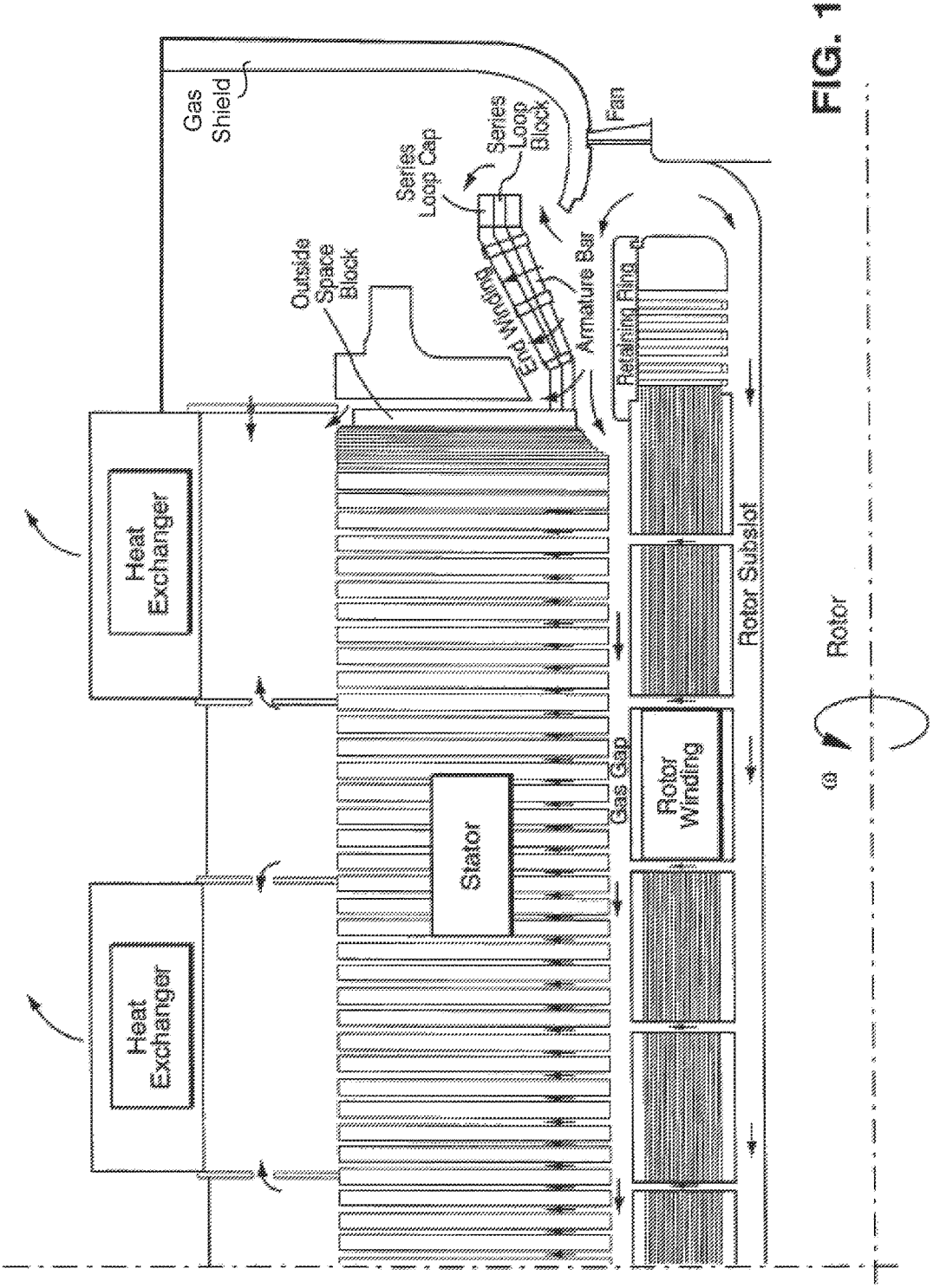
FIG. 1 is a schematic diagram of ventilation flow distribution in a forward flow generator.

Cooling, ventilation and insulation are prime considerations in the design of dynamoelectric machines, such as generator and motors. Many of the benefits associated with improved reliability and increased power capability can be traced directly to improved thermal and insulation design. In a once-through ventilated hydrogen-cooled generator, the cooling gas from the ventilating fan is distributed into four branches: the gas gap between the rotor and stator, the rotor subslot, the outside space block, and through the end-winding (see FIG. 1). To cool the ends of armature bars/coils near the series loop caps, the cooling gas passes through the gap between the edges of armature bars/coils and the tip of the gas shell. Thus, in order to achieve a relatively uniform temperature distribution and to minimize ventilating windage losses, the cooling flow path must be properly configured. Series loop caps cover the joint between two end windings. The series loop caps also insulate one series loop from a neighboring series loop, as adjacent series loops may be at vastly different voltages.

Figure 2:
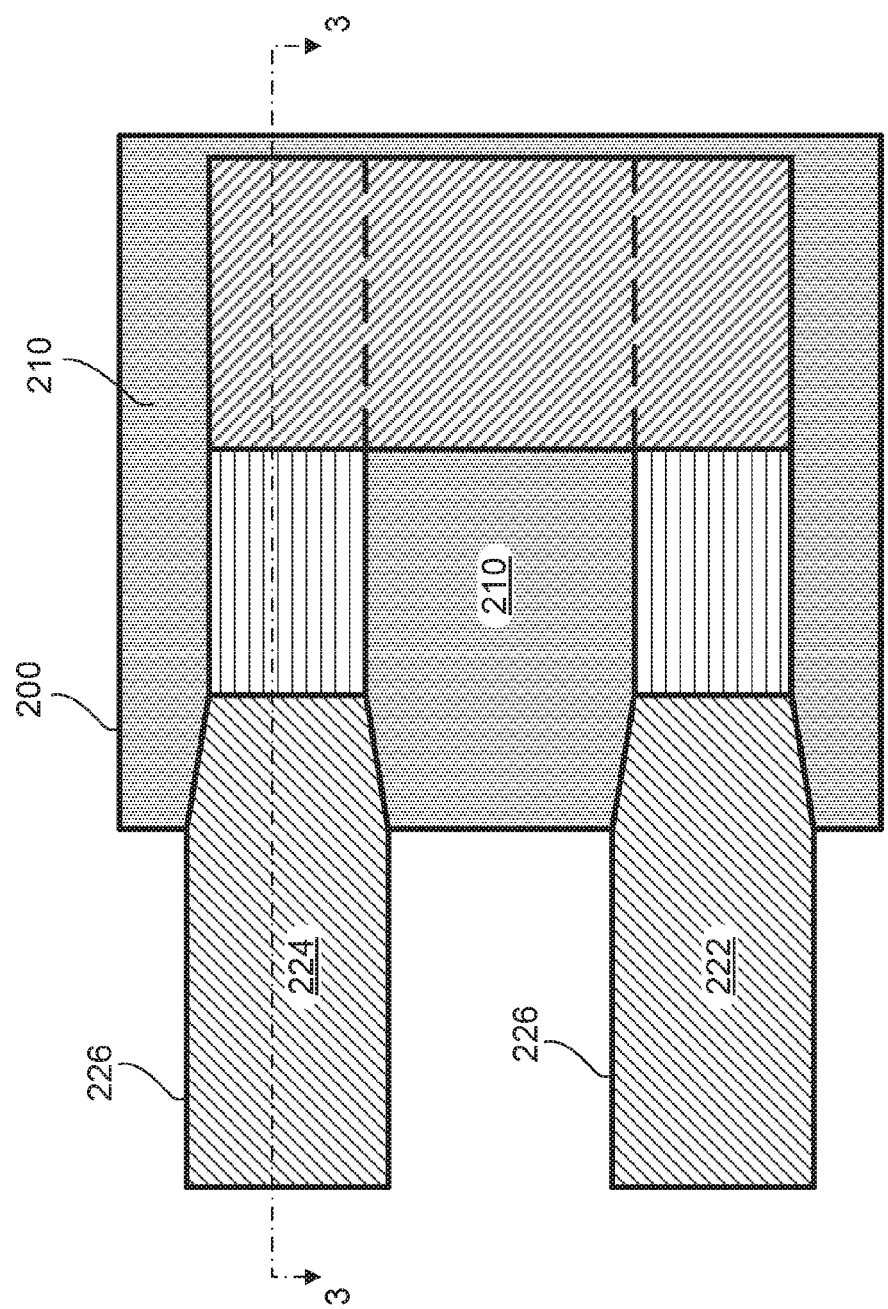
FIG. 2 illustrates a cross-sectional view of a series loop cap, having an electrically insulating composition encasing two end windings.
Figure 3:
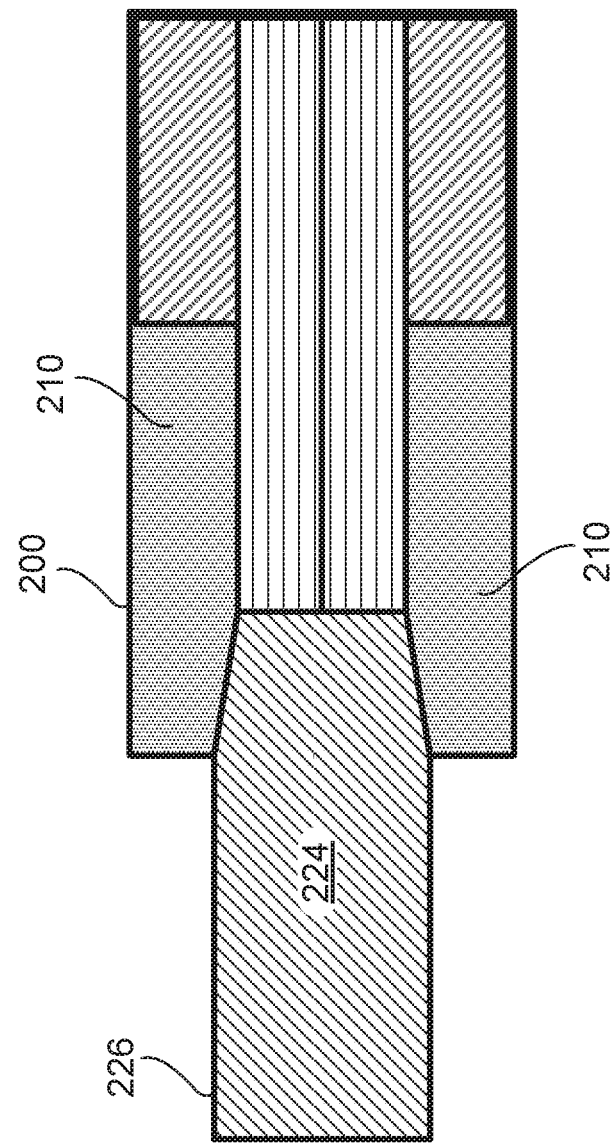
FIG. 3 illustrates a cross-sectional top view along section line 3-3 in FIG. 2 of a series loop cap that contains the electrically insulating composition encasing two end windings, according to an aspect of the present invention.

FIG. 2 illustrates a cross-sectional view of a series loop cap 200 that contains an electrically insulating composition 210 encasing two end windings 222, 224, according to an aspect of the present invention. FIG. 3 illustrates a cross-sectional top view along section line 3-3 in FIG. 2 of a series loop cap 200 that contains an electrically insulating composition 210 encasing two end windings 222, 224, according to an aspect of the present invention. The end windings 222, 224 may be brazed together to form an electrical connection between the two end windings. The electrically insulating composition 210, which may be in the form of a putty when installed, encases and electrically insulates the series loop connection of the end windings. The cap 200 serves as a container for, or hard shell over, the electrically insulating composition 210. The electrically insulating composition 210 has a medium to high viscosity when installed, but then hardens to a rigid and solid mass after curing. The resulting rigidity provides structural support for inter-cap blocking. For example, rigid blocks (not shown) may be placed between adjacent caps 200, and then wrapped and frapped to secure the blocking. Therefore, the electrically insulating composition 210 needs to be rigid and hard to support the inter-cap blocking. The end windings 222, 224 have a primary insulating layer 226 formed thereon, which is comprised of multiple layers of paper, felt, glass fabric/tape and/or other insulating layers. The electrically insulating composition 210 functions as a secondary insulation layer. However, the electrically insulating composition 210 is also thermally conductive to help transfer heat out of the windings 222, 224.

The electrically insulating composition 210 is comprised of filler materials and a resin, and this will be used with a catalytic hardener and accelerator (or any other suitable curing agent). The filler materials may comprise about 25 to 55 percent by weight of the composition, while the resin makes up the balance, which is about 45 to 75 percent by weight. The electrically insulating composition 210 will have a through-plane thermal conductivity of about 0.2 to about 1.3 W/m-K when measured at 130° C. These levels of through-plane thermal conductivity will facilitate heat removal from the end windings encased in the series loop caps.

The filler materials may include glass, boron nitride and fumed silica. The glass is preferably silane-treated glass, and the fumed silica is also preferably silane-treated. The silane treatment is used to promote adhesion by creating a hydrophobic surface, and it also improves the mechanical and workability characteristics of the glass and silica. The fumed silica, which may also be referred to as pyrogenic silica, is typically produced in a flame and consists of microscopic droplets of amorphous silica fused into branched, chainlike secondary particles which agglomerate into tertiary particles. The resulting powder has a very low bulk density and high surface area. The three dimensional structure of the fumed silica results in a viscosity increasing, thixotropic behavior when used as a thickener or filler.

Boron nitride is added to increase thermal conductivity. The boron nitride may be a mix of spherical boron nitride or PTX60 (e.g., Momentive PTX60) and flake boron nitride or PT110 (e.g., Momentive PT110)). PTX60 and PT110 may be obtained from Momentive Performance Materials Inc., Waterford, N.Y. Spherical boron nitride or PTX60 is typically a powder having a spherical agglomerate structure, mean particle size of about 55 to 65 micrometers, a surface area of about 7 $m^2$/gram, a tap density of about 0.4 $g/cm^3$, an oxygen percent of about 0.3, carbon percent of about 0.05 and soluble borate percentage of about 0.1. Flake boron nitride or PT110 typically has a single-crystal platelet or flake structure, a mean particle size of about 45 micrometers, a surface area of about 0.6 $m^2$/gram, a tap density of about 0.7 $g/cm^3$, an oxygen percent of about 0.3, carbon percent of about 0.03 and soluble borate percentage of about 0.05.

The resin may be a bisphenol A (BpA) resin, which is an organic synthetic compound with a chemical formula (CH3)2C(C6H4OH)2 belonging to the group of diphenylmethane derivatives and bisphenols with two hydroxyphenyl groups. The resin may also include a bisphenol F (BpF) resin, which has a lower viscosity than a BpA resin. The two types of resins may also be combined, for example, the composition may have a mix of about 80 percent BpA resin and about 20 percent BpF resin. Alternatively, a single resin may be used (e.g., 100 percent BpA resin). In addition, a pigment may also be added to the composition to differentiate different mixtures by adding a specific color, (e.g., red, green, blue, etc.).

As non-limiting examples only, some example electrically insulating compositions will now be described. A first composition may have about 15 to about 25 percent by weight of glass, 0 to about 1.5 percent by weight of fumed silica and 0 to about 30 percent by weight of boron nitride, with the balance of the percentage being resin. The total percentage will be equal to or less than 100 percent. The glass and fumed silica is preferably silane-treated. In this example the resin may be 100 percent BpA, or a mixture of about 80 percent BpA and about 20 percent BpF. The boron nitride may also be a mixture of about 80 percent spherical boron nitride or PTX60 and about 20 percent flake boron nitride or PT110. The term about, when referring to percentages, may be defined as giving the stated values a tolerance of approximately 2.5 percent to 10 percent, or any subrange therebetween. An optional pigment may also be added to this composition (e.g., about 0.1 to about 0.5 percent or more, depending on pigment characteristics). The pigment percentage is primarily defined by the desired color and intensity. The through-plane thermal conductivity of such an electrically insulating composition will be about 0.2 to about 1.3, or 0.6 to 1.0, W/m-K when measured at 130° C.

A second example for the electrically insulating composition 210 is, about 20 percent silane-treated glass, 0 to about 0.2 percent silane-treated fumed silica, about 22.5 percent boron nitride, about 0.1 percent pigment and the balance being resin, which in this case would be about 57.3 percent. In this example the resin is 100 percent BpA, or a mixture of about 80 percent BpA and about 20 percent BpF. The boron nitride is a mixture of about 80 percent spherical boron nitride or PTX60 and about 20 percent flake boron nitride or PT110. The through-plane thermal conductivity of such an electrically insulating composition is about 0.97 W/m-K when measured at 130° C.

A third example for the electrically insulating composition 210 is, about 25 percent silane-treated glass, about 0.2 percent silane-treated fumed silica, about 15 percent boron nitride, and the balance being resin, which in this case would be about 59.8 percent. In this example the resin is 100 percent BpA, or a mixture of about 80 percent BpA and about 20 percent BpF. The boron nitride is a mixture of about 80 percent spherical boron nitride or PTX60 and about 20 percent flake boron nitride or PT110. The through-plane thermal conductivity of such an electrically insulating composition is about 0.64 W/m-K when measured at 130° C.

New electrically insulating compositions with high thermal conductivity filler added have to have handling, application and electrical, mechanical and thermal capability performances equal to or better than present series loop capping compound materials. Simply adding only a thermally conductive filler (e.g., boron nitride) would not achieve the desired result as the desired electrical and mechanical properties would be lacking. The present invention uses a balance of materials to achieve the overall properties mentioned above (e.g., mechanical, thermal, electrical, etc.). Furthermore, the present invention may be used with bar to bar connections, coil to coil connections, series loop connections or joints between connection rings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electrically insulating composition comprising:
   about 25 to about 55 percent by weight of filler materials, the filler materials comprising about 15 to about 25 percent of silane-treated glass, 0 to about 30 percent of boron nitride, and 0 to about 1.5 percent of silane-treated fumed silica;
   about 45 to about 75 percent by weight of Bisphenol resin; and
   wherein the percentages being selected such that the total percentage of components does not exceed 100 percent, and the composition having a thermal conductivity of about 0.2 to about 1.3 W/m-K when measured at 130° C.

2. The composition of claim 1, the resin comprising:
   about 80 percent Bisphenol A (BpA) resin, and
   about 20 percent Bisphenol F (BpF) resin.

3. The composition of claim 1, the boron nitride comprising:
   about 80 percent spherical boron nitride, and
   about 20 percent flake boron nitride.

4. The composition of claim 3, and the composition having a thermal conductivity of about 0.64 W/m-K when measured at 130° C.

5. The composition of claim 1, further comprising a pigment to color the composition.

6. The composition of claim 1, further comprising a catalytic hardener and accelerator.

7. An electrically insulating composition to be used with a catalytic hardener and accelerator, the composition comprising:
   about 25 to about 55 percent by weight of filler materials, the filler materials comprising:
   (a) about 15 to about 25 percent of glass;
   (b) 0 to about 30 percent of boron nitride;
   (c) 0 to about 1.5 percent of fumed silica;
   about 45 to about 75 percent by weight of resin, the resin comprising Bisphenol A (BpA) resin; and
   wherein the percentages being selected such that the total percentage of composition components does not exceed 100 percent, and the composition having a thermal conductivity of about 0.2 to about 1.3 W/m-K when measured at 130° C.

8. The composition of claim 7, the composition components comprising:
   about 20 percent silane-treated glass;
   about 22.5 percent boron nitride;
   about 0 to 0.2 percent silane treated fumed silica;
   about 0.1 percent pigment; and
   about 57.3 percent resin, wherein the resin comprises the balance of components.

9. The composition of claim 8, the boron nitride comprising:
   about 80 percent spherical boron nitride, and
   about 20 percent flake boron nitride.

10. The composition of claim 9, the resin comprising:
    about 80 percent Bisphenol A (BpA) resin, and
    about 20 percent Bisphenol F (BpF) resin.

11. The composition of claim 9, the composition having a thermal conductivity of about 0.97 W/m-K when measured at 130° C.

12. The composition of claim 7, the composition components comprising:
    about 25 percent silane-treated glass;
    about 15 percent boron nitride;
    about 0.2 percent silane treated fumed silica; and
    about 59.8 percent resin, wherein the resin comprises the balance of components.

13. The composition of claim 12, the boron nitride comprising:
    about 80 percent spherical boron nitride, and
    about 20 percent flake boron nitride.

14. The composition of claim 13, the resin comprising:
    80 percent Bisphenol A (BpA) resin, and
    20 percent Bisphenol F (BpF) resin.

15. The composition of claim 13, the composition having a thermal conductivity of about 0.64 W/m-K when measured at 130° C.

16. An electrically insulating composition to be used with a catalytic hardener and accelerator, the composition adapted for insulating generator components, the composition comprising:
    about 20 to 25 percent of silane-treated glass;
    about 15 to 22.5 percent of boron nitride, the boron nitride comprising about 80 percent spherical boron nitride and about 20 percent flake boron nitride;
    about 0.2 percent of silane-treated fumed silica;
    about 0 to 0.5 percent pigment;
    resin comprising the balance, the resin comprising Bisphenol A (BpA) resin; and
    wherein the percentages being selected such that the total percentage of composition components does not exceed 100 percent, and the composition having a thermal conductivity of about 0.6 to about 1.0 W/m-K when measured at 130° C.

17. An electrically insulating composition comprising:
    about 25 to about 55 percent by weight of filler materials, the filler materials comprising silane-treated glass, boron nitride, and silane-treated fumed silica, the boron nitride comprising a mixture of spherical boron nitride and flake boron nitride;
    about 45 to about 75 percent by weight of Bisphenol A (BpA) resin; and
    wherein the percentages being selected such that the total percentage of components does not exceed 100 percent.

* * * * *